(12) United States Patent
Daimon et al.

(10) Patent No.: US 7,828,466 B2
(45) Date of Patent: Nov. 9, 2010

(54) LIGHT-EMITTING DEVICE

(75) Inventors: Sueyoshi Daimon, Tokyo (JP);
Tsunehide Naruse, Mito (JP); Yukiharu Suzuki, Tokyo (JP)

(73) Assignee: Tamura Corporation, Tokyo (JP)

( * ) Notice: Subject to any disclaimer, the term of this patent is extended or adjusted under 35 U.S.C. 154(b) by 190 days.

(21) Appl. No.: 12/177,794

(22) Filed: Jul. 22, 2008

(65) Prior Publication Data

US 2009/0027895 A1    Jan. 29, 2009

(30) Foreign Application Priority Data

Jul. 27, 2007    (JP) .............................. 2007-196080

(51) Int. Cl.
*F21S 4/00* (2006.01)
(52) U.S. Cl. .................................. 362/311.02; 362/223
(58) Field of Classification Search ............ 362/311.02, 362/555, 558, 223, 217.11, 249.02
See application file for complete search history.

(56) References Cited

U.S. PATENT DOCUMENTS 6,319,425 B1 * 11/2001 Tasaki et al. ........... 252/301.36

2006/0146531 A1 * 7/2006 Reo et al. .................... 362/373

FOREIGN PATENT DOCUMENTS

| JP | 03-159362 | 7/1991 |
|---|---|---|
| JP | 2005-031596 | 2/2005 |
| JP | 2005-241869 | 9/2005 |
| JP | 2006-171256 | 6/2006 |
| JP | 2007-059163 | 3/2007 |
| WO | 2006-090858 | 8/2006 |

* cited by examiner

*Primary Examiner*—David V Bruce (57) ABSTRACT

A light-emitting device of a very simple configuration in which uniform LED light illumination can be obtained with a low light quantity loss, the device having a low production cost, improved emission characteristic and excellent cost efficiency and reliability. A transparent body is disposed in the vicinity of a LED, and a light-scattering layer that scatters the light of the LED is formed by coating on the light-illuminating surface of the transparent body through which the light of the LED passes. The light-scattering layer contains 2.5 parts by weight to 4 parts by weight of a filler and has a thickness of 5 μm to 20 μm.

10 Claims, 5 Drawing Sheets

LIGHT-EMITTING DEVICE

BACKGROUND OF THE INVENTION

1. Field of the Invention

The present invention relates to a light-emitting device using a LED, and more particularly to a light-emitting device with improved uniformity and brightness of illumination light.

2. Description of the Related Art

Typical light sources such as incandescent lamps, mercury vapor lamps, and fluorescent lamps are light-emitting devices that convert electricity into light. These light sources have the following drawbacks. Namely, incandescent lamps generate a large amount of heat during light emission, mercury vapor lamps have a high power consumption due to a high voltage applied thereto, and fluorescent lamps cause a great environmental load since they are filled with heavy metals such as mercury.

Global warming has recently become a serious problem, and the decrease in energy consumption and reduction of carbon dioxide emission are the tasks of global importance. Accordingly, measures for protecting environment, such as reduction of energy consumption, are also important in the field of light-emitting devices. Light-emitting devices using a LED as a light source have been suggested to meet this need (for example, Japanese Patent Application Laid-open No. 2007-59163).

By contrast with incandescent lamps, LED generates little heat in the course of light emission and has a very low level of power consumption of several tens of milliamperes per unit. Moreover, LED demonstrates a long service life of not less than 70,000 hours. Therefore, light-emitting devices using LED are expected to be effective means for protecting environment.

However, although LED has the above-described merits, since it is a point light source, a sufficient quantity of light cannot be obtained with one unit. For this reason, it was difficult to ensure light intensity over a wide illuminating surface area with a light-emitting device using a LED. Accordingly, high-brightness white LED (power white LED) has been recently developed, which can be operated at a low voltage level and also ensure good visibility. Further, in order to obtain a sufficient luminous flux, various techniques have been suggested, such as a technique using a multiple integrated arrangement in which a large number of LED are arranged in a plane, and a technique using optical designs in which a reflector and an optical lens are arranged (Japanese Patent Applications Laid-open Nos. 2006-171256 and H03-159362).

However, the aforementioned light-emitting devices using LED have been pointed out to have the following problems. Thus, the development of power white LED and optical designs including optical lenses and the like are aimed at ensuring the quantity of light, but according to the present trend toward light-emitting devices of more larger size, it is desirable to ensure more larger quantity of light and enable uniform light emission over a wide illuminating surface area.

Further, in the light-emitting device in which a large number of LED are integrated, or light-emitting devices based on an optical design including optical lenses or the like, the device configuration easily becomes complex, thereby causing increase in cost. Further, power white LED demonstrating sufficiently high brightness are expensive. As described above, light-emitting devices using LED are expected to be effective means for protecting environment, and suitability thereof for industrial applications has to be increased to enable wide spread of such devices. Thus, problems associated with light-emitting devices include not only ensuring sufficient quantity of light and attaining light uniformity, but also minimizing production cost.

Further, as the device configuration becomes more complex, light emission characteristic is often degraded. More specifically, when an optical lens is formed by molding to obtain a lens effect, since the lens covers a LED, heat is emitted by the LED and the light emission characteristic of the LED becomes unstable due to this heat. As a result, the service life of LED can be shortened.

SUMMARY OF THE INVENTION

With the foregoing in view, it is an object of the present invention to provide a light-emitting device of a very simple configuration in which uniform LED light illumination can be obtained with a low light loss, production cost can be reduced and emission characteristic are improved, thereby obtaining excellent cost efficiency and reliability.

In order to attain the above-described object, the present invention provides a light-emitting device which comprises: a transparent body that is disposed in the vicinity of the LED or so as to incorporate the LED inside thereof; and a light-scattering layer that scatters light of the LED, which is formed by coating, within the surface of the transparent body, on a light-illuminating surface that illuminates the light from the LED to the outside.

An optical system including a light-scattering layer is required to produce simultaneously two effects that are mutually excluding, namely, to scatter light and to avoid loss of quantity of light that is caused to propagate by refraction and transmission. Therefore, in the light-scattering layer of the present invention, types of materials, concentrations and thicknesses thereof, and configurations that can ensure optically light scattering characteristic and minimize light loss are limited. Such light-scattering layers are formed by uniformly dispersing substantially spherical fine particles in a binder layer composed of a coating composition containing a transparent resin as a binder. Based on the concept of a typical matte coating material, the amount of the fine powder added to the binder layer is very small. More specifically, the optimum amount is 2.5 parts by weight to 4 parts by weight. The optimum thickness of the light-scattering layer is 5 µm to 20 µm.

With the above-described present invention, by forming the light-scattering layer on the light-illuminating surface of the transparent body, it is possible to distribute and scatter adequately the light from the light source and increase uniformity of illumination light from the transparent body. Further, since the light loss caused by the light-scattering layer is reduced to a minimum, the light-illuminating surface of the transparent body can emit sufficiently bright light. In addition, since the light-scattering layer is provided by coating, the light-scattering layer can be readily formed even when the transparent body has a complex shape. Therefore, the production cost can be reduced.

With the light-emitting device in accordance with the present invention, the light from the light source can be optimally scattered, sufficient quantity of light can be ensured, and uniform and bright light emission can be obtained with a very simple configuration of forming a light-scattering layer on a transparent body by coating. Moreover, since the production cost can be suppressed, cost efficiency and reliability can be improved.

DESCRIPTION OF THE PREFERRED EMBODIMENTS

The best mode for carrying out the present invention (referred to hereinbelow as "embodiment") will be specifically described below with reference to the appended drawings.

(1) First Embodiment

[Configuration]

Figure 1:
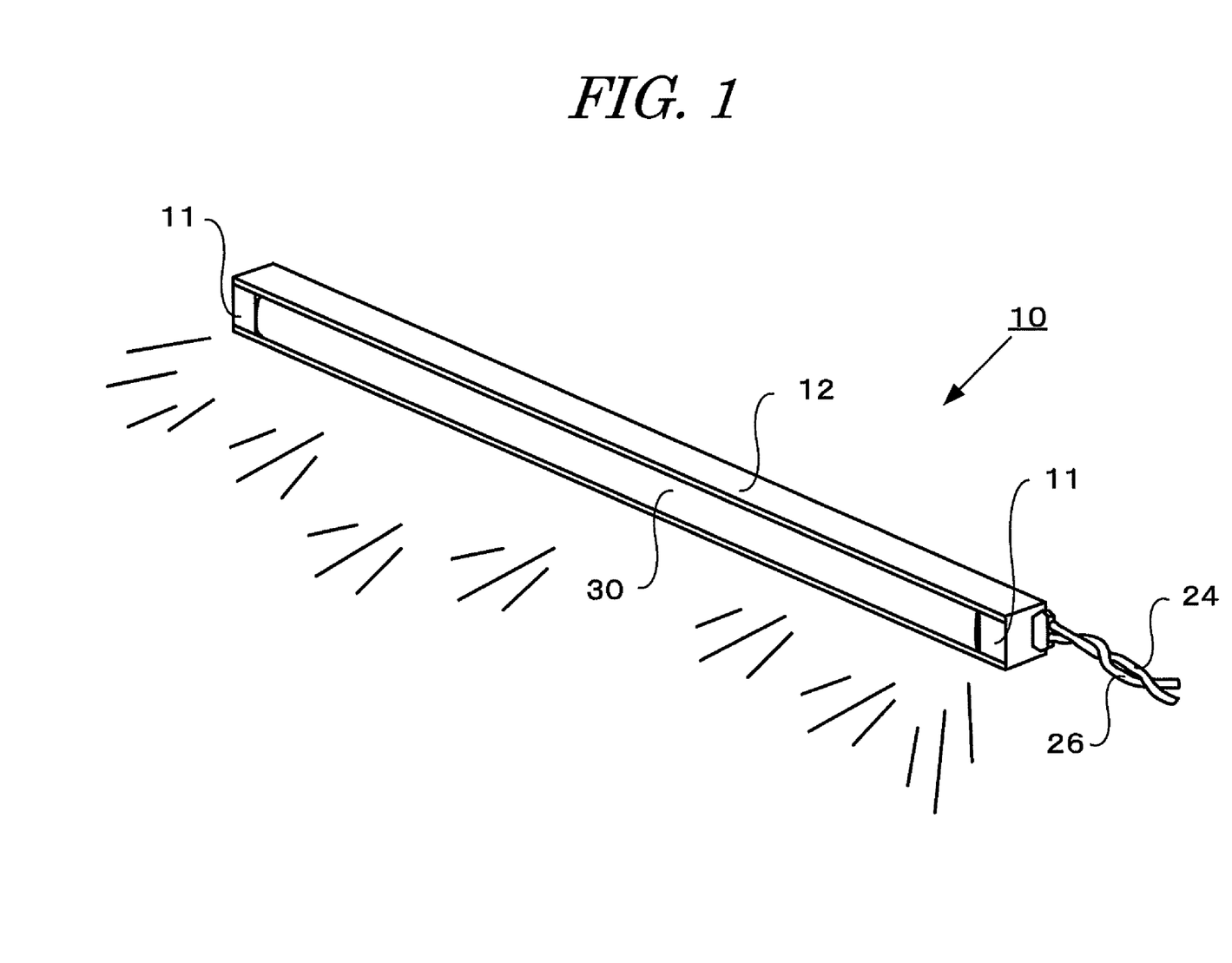
FIG. 1 is a perspective view of a first embodiment according to the present invention.
Figure 2:
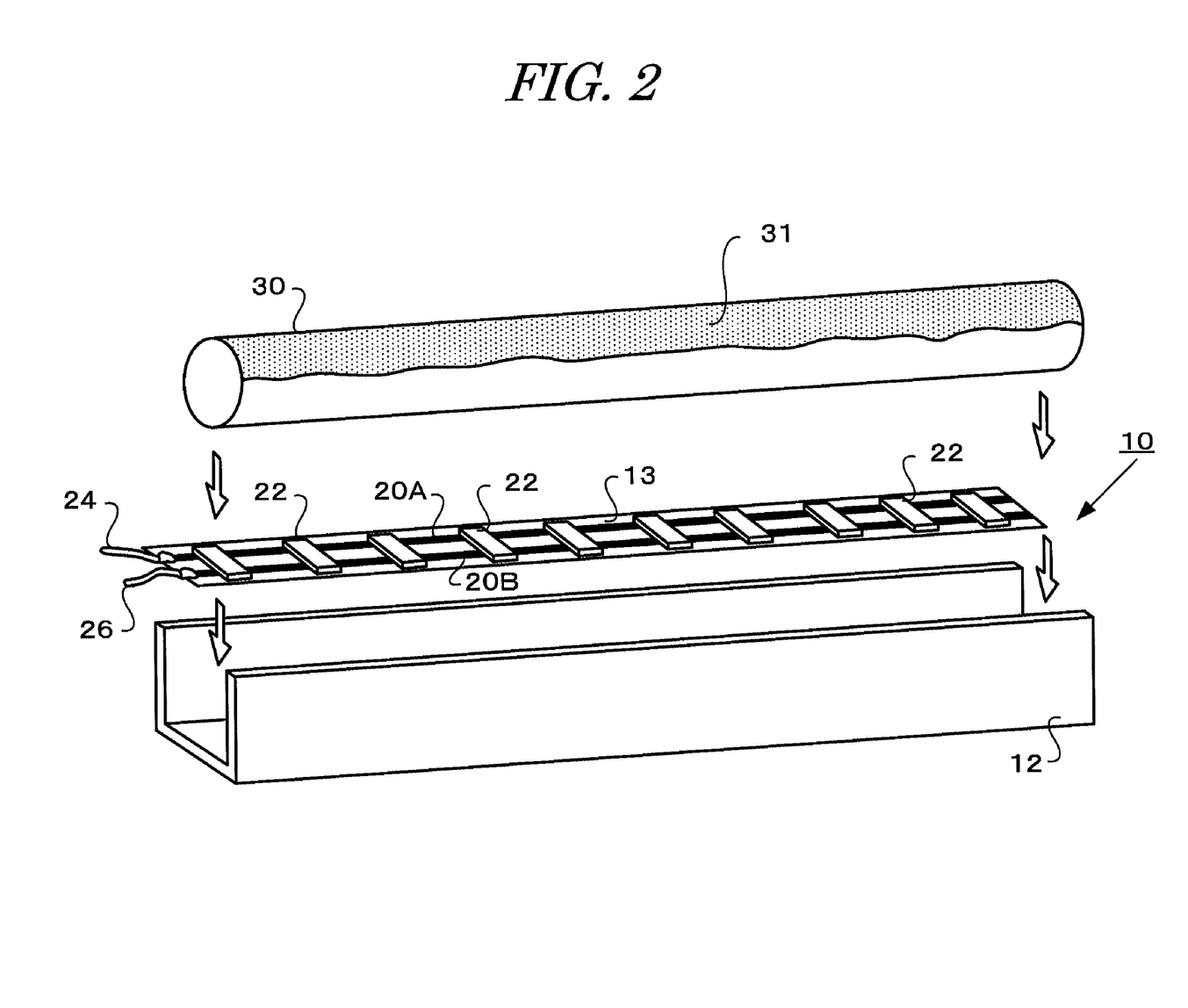
FIG. 2 is an exploded perspective view of the first embodiment.

FIG. 1 is a perspective view illustrating the configuration of the first embodiment, and FIG. 2 is an exploded perspective view thereof. In the present embodiment, the present invention is applied to an elongated light-emitting device 10 using a LED 22 as a light source. As shown in FIG. 1 and FIG. 2, the light-emitting device 10 is provided with an elongated light cover 12. The light cover 12 has a longitudinal direction as a reference direction and a cross-sectional direction perpendicular thereto and has an opening that is open along the longitudinal direction so that the shape in the cross-sectional direction is a substantially U-shape.

Inside the light cover 12, a plurality of LED 22, which are the light sources, are disposed so as to form a row along the longitudinal direction of the light cover 12, and one transparent body 30 is disposed in the vicinity of these LED 22 (the distance therebetween is about 0 mm to 2 mm). The transparent body 30 has a longitudinal direction (reference direction) and a cross-sectional direction respectively corresponding to the longitudinal direction (reference direction) and cross-sectional direction of the light cover 12 and is attached to the inner side of the light cover 12 so as to cover the outputting surface of the plurality of LED 22 forming a row along the longitudinal direction of the light cover 12. End covers 11 (shown in FIG. 1) are provided at both ends in the longitudinal direction of the transparent body 30. The light covers 12 are formed from a material such as an aluminum alloy or a plastic, and brought into contact with the transparent body 30 so as to be pressed against it from both sides in the longitudinal direction thereof.

As shown in FIG. 2, the plurality of LED 22 are mounted on an elongated substrate 13 having a longitudinal direction corresponding to the longitudinal direction of the light cover 12. Here, electrode patterns 20A, 20B extending linearly along the longitudinal direction of the substrate 13 are formed parallel each other on the elongated substrate 13. The plurality of LED 22 are arranged on these electrode patterns 20A, 20B so as to be parallel to each other and equidistant along the linear direction of the electrode patterns and are electrically connected to the electrode patterns 20A, 20B. Respective one end of each electrode pattern 20A, 20B are connected to lead wires 24, 26, respectively. The transparent body 30 is made from an acrylic resin and has a diameter of about 5 mm to 20 mm. A light-scattering layer 31, which is the main feature of the present invention, is formed by coating on the circumferential surface of the transparent body 30 on the side opposite the LED 22, that is, on the illuminating side (upper side in FIG. 2) where the light from the LED 22 is illuminated to the outside.

The light-scattering layer 31 is formed by mixing 50 parts by weight of an acrylic resin as a binder, 47 parts by weight of an organic solvent, and 3 parts by weight of a filler to prepare a coating composition, and uniformly coating the coating composition by a spraying method on the illuminating surface side of the transparent body 30. The organic solvent is a mixture of an alcohol, a ketone, an ester, and a toluene, and the ratio of components therein is adjusted according to the desired solubility, volatility, and leveling characteristic.

The filler contained in the light-scattering layer 31 is a transparent material that has a substantially spherical shape. Silica fine powder is used as a specific material. A mean particle size of the silica is 0.1 µm to 10 µm. In relation to the amount of filler added to the light-scattering layer, the effective range thereof is narrow, and this amount is specifically adjusted to a range of 2.5 parts by weight to 4 parts by weight. The thickness of the light-scattering layer 31 is 5 µm to 20 µm in a dry state.

When the light-scattering layer 31 is formed by coating the coating composition, the above-described ratio of components therein is adjusted to obtain the optimum viscosity of the coating material. In this case, the light-scattering layer 31 is formed by coating the coating composition, while paying attention to solubility and evaporation rate, so as to cause no deterioration of coated film properties, such as whitening and goose flesh pattern. The range of from 2.5 parts by weight to 4 parts by weight of the amount of filler added to the light-scattering layer is about half that of the usual matte coating material. Therefore, it is important to disperse the filler uniformly in the light-scattering layer 31.

The light-scattering layer 31 is the main structural component of the present embodiment. Therefore, it has to be manufactured under sufficiently strict control, rather than by a simple process for manufacturing coating materials that is employed in the general coating work. As a specific manufacturing method, a diluent for adjusting the concentration is gradually added so as to cause no lumps or aggregates, mixing is performed, and then the components are uniformly mixed by slow stirring, while preventing foaming. A mixing method in which a shear force is applied to the mixture is implemented, for example, by actively dispersing the filler by using a paint shaker or the like, and the filler held on the coated base material is returned to a uniform dispersion state.

[Action and Effect]

The first embodiment having the above-described configuration demonstrates the following action and effect. The light is required to be uniformly scattered in the light-scattering layer 31, but if the intensity of light scattering is too high, light shielding is intensified, the quantity of light is decreased, and sufficient brightness cannot be obtained. Accordingly, in the present embodiment, the amount of filler added to the light-scattering layer 31 is selected within the above-described range of from 2.5 parts by weight to 4 parts by weight, thereby ensuring both the optimum light scattering and the prevention of light quantity loss.

More specifically, when the amount of filler added is 2.5 parts by weight, somewhat uneven illumination intensity is observed, but the uniformity is practically not inhibited, light scattering characteristic is ensured, and the light is sufficiently diffused. Therefore, bright light can be illuminated.

Further, when the amount of filler added is 3 parts by weight and 4 parts by weight, both the irradiance level and the scattering characteristic are sufficient and the illumination intensity is even. The difference between the case in which the amount of filler added is 3 parts by weight and the case in which it is 4 parts by weight is that in the former case the illumination intensity is better, whereas in the latter case, the scattering characteristic is better.

On the other hand, where the amount of filler added is less than 2.5 parts by weight, the scattering effect is insufficient, the light flux of LED 22 is unchanged, and light spread is insufficient. In particular, when the filler is not present at all, bright light can be illuminated without loss, but scattering characteristic is insufficient. As a result, spectral phenomena of light occur. Where the amount of filler added is above 4 parts by weight, the scattering of light becomes too intensive and light intensity loss increases. As a result, the darkness level is increased and the improvement of visibility that is a specific feature of the light of LED 22 is lost.

In the present embodiment, by restricting the amount of filler to 2.5 parts by weight to 4 parts by weight, it is possible to distribute and scatter adequately the light from the LED 22 and to obtain a uniform illumination light. Further, since the light intensity loss caused by the light-scattering layer 31 is minimized, the light-illuminating surface of the transparent body 30 is sufficiently bright. Moreover, since the light-scattering layer 31 is formed by coating, the transparent body 30 can be formed in a very easy manner. Therefore, excellent light emission characteristic can be obtained, the production cost can be greatly reduced, and cost efficiency is improved. Further, the amount of filler added to the light-scattering layer 31 is finely adjusted according to the grain size and the target light flux.

In the present embodiment the thickness of the light-scattering layer 31 is 5 μm to 20 μm in a dry state. The reasons for selecting such a range will be described below. Where the thickness of the light-scattering layer 31 is less than 5 μm, the brightness level is increased, but light scattering is insufficient and light uniformity is degraded. Conversely, where the thickness of the light-scattering layer 31 exceeds 20 μm, light scattering is sufficient, but light intensity becomes insufficient. Therefore, by confining the thickness of the light-scattering layer 31 to a range of 5 μm to 20 μm, it is possible to ensure both the light uniformity and the brightness. Further, the above-described thickness range of the light-scattering layer 31 is preferred in terms of ensuring uniformity and brightness of light, but it can be appropriately adjusted according to the required specifications of the light-emitting device 10.

As described hereinabove, with the light-emitting device 10 of the present embodiment, although the LED 22 are point light sources, the light-scattering layer 31 formed on the transparent body 30 makes it possible to cause optimum scattering of light from the LED 22 and ensure sufficient quantity of light. Thus, by providing the transparent body 30 having the light-scattering layer 31 formed thereon, it is possible to scatter uniformly the light of LED 22 and demonstrate excellent light emission characteristic by light distribution control with a simple optical system composed of the transparent body 30.

Further, since the entire light-emitting device 10 produces uniform high-intensity light along the longitudinal direction, it is very effective as a light source for incorporation in elongated sign devices such as light-emitting sign boards. The elongated light-emitting device 10 of the present embodiment can be used as a special light-emitting body for illumination that produces a uniform parallel light beam or as a light-emitting body that can be used similarly to the conventional fluorescent lamps. Moreover, in the present embodiment, light is emitted at a low power, the power consumption is small, and heat generation is inhibited. As a result, the light-emitting device can be also used as a light source for spot illumination for airplanes and the like.

In the present embodiment, the transparent body 30 is arranged at a certain distance from the LED 22, thereby creating a space around the LED 22. As a result, the effect of heat dissipation from LED 22 is increased. In this aspect, the present embodiment is significantly different from the conventional technology in which a LED generates heat due to a molded optical lens. In other words, anyone should not be concerned about heat-induced degradation of light emission characteristic of LED 22 and a long service life that is a merit of LED 22 can be further extended.

Further, in the present embodiment, a simple configuration in which the light-scattering layer 31 is formed on the transparent body 30 is realized. Moreover, the light-scattering layer 31 is formed by spray coating, without using any exceptionally difficult method. Therefore, the production is easy and inexpensive.

(2) Second Embodiment

[Configuration]

Figure 3:
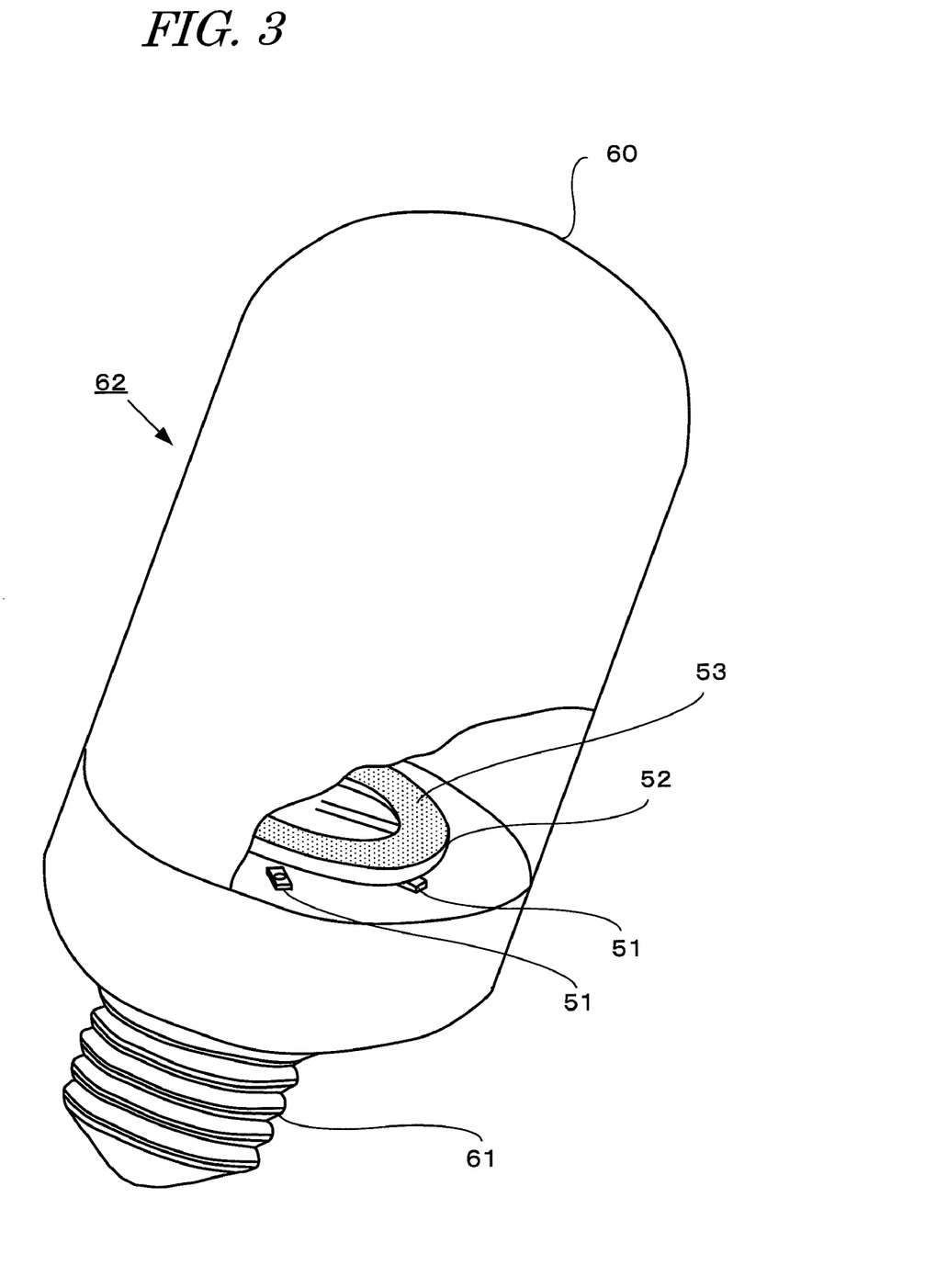
FIG. 3 is a perspective view of a second embodiment according to the present invention.
Figure 4:
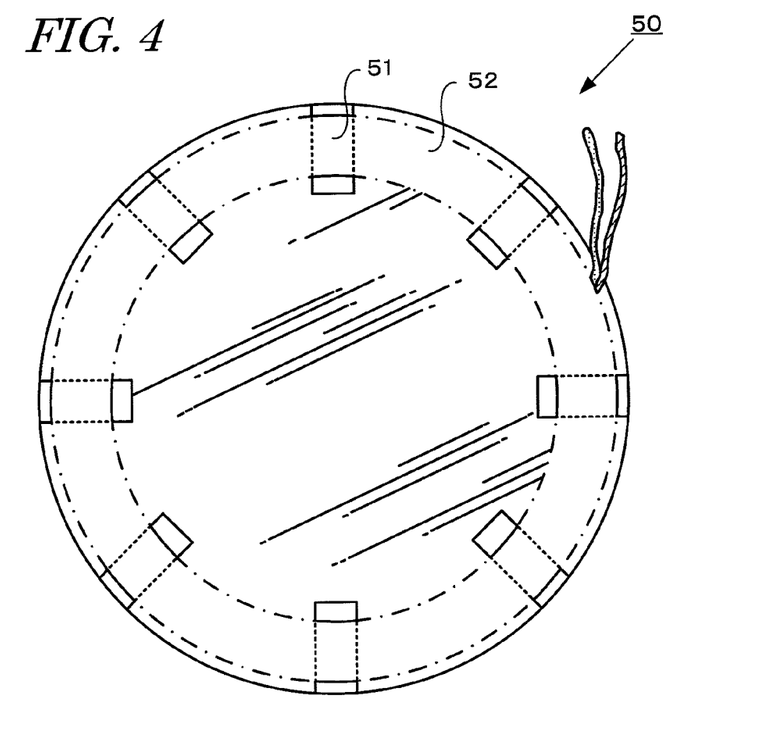
FIG. 4 is a plan view of the main portion of the second embodiment.
Figure 5:
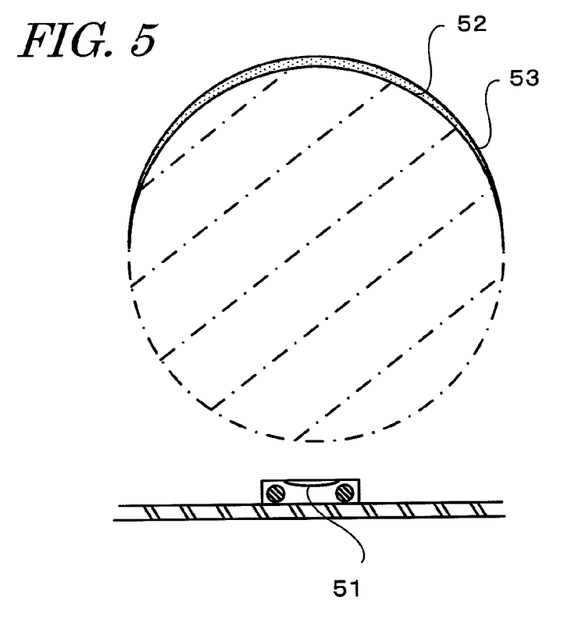
FIG. 5 is a side view of the main portion of the second embodiment.

FIG. 3 is a perspective view illustrating the configuration of the second embodiment. FIG. 4 is a plan view of the main portion of the second embodiment. FIG. 5 is a side view of the main portion of the second embodiment. A light-emitting device 62 of an electric bulb type of the second embodiment is composed of a cylindrical cover 60 with a semispherical upper portion and a socket 61 of a substantially circular cross section that is disposed substantially concentrically with the lower portion of the cover 60 and fixed thereto. The socket 61 accommodates a power source section and is of a replaceable type compatible with the conventional incandescent lamps.

A ring-shaped transparent body 52 of a substantially circular cross section is disposed substantially concentrically with the cover 60 and socket 61 inside the light-emitting device 62. The ring-shaped transparent body 52 is produced from an acrylic resin by injection molding and has a cross section diameter of 5 mm to 20 mm. As shown in FIG. 4, a total of eight LED 51 are disposed equidistantly with a spacing of about 0 mm to 2 mm below the ring-shaped transparent body 52 along the circumferential portion of the ring-shaped transparent body 52. A light-scattering layer 53 is formed by coating on the circumferential surface on the illuminating side (upper side in FIG. 4) where the light from the LED 51 in the ring-shaped transparent body 52 is illuminated to the outside. The range of the amount of filler added to the light-scattering layer 53 and the layer thickness are identical to those of the above-described first embodiment.

[Action and Effect]

According to the second embodiment, the light-scattering layer 53 formed on the ring-shaped transparent body 52 can provide optimum scattering of light from the LED 51 and ensure sufficient quantity of light. Therefore, bright and uniform light emission can be achieved. In addition, since the light-scattering layer 53 is formed by coating, the cost can be substantially reduced.

Further, in the second embodiment, the socket 61 is compatible with the conventional incandescent lamps. Therefore, a light-emitting device with a wide range of applications, including outdoor and indoor illumination is obtained. In addition, a plurality of light-emitting devices 62 having the ring-shaped transparent body 52 can be combined, thereby enabling the application as a light source for illumination devices with a large quantity of light that have a wider illuminating surface areas. Moreover, a low voltage enables applications to autonomous illumination devices having individual solar power generator and a power storage.

A specific number of installed LED 51 and arrangement thereof can be appropriately adjusted according to the desired quantity of light and color. In this case, the quantity of light and color can be switched by installing a plurality of units as one set, and the color of the cover 60 can be appropriately changed according to the usage requirements by employing a resin of milk white color, a transparent resin, or a colored resin.

(3) Other Embodiments

The light-emitting device in accordance with the present invention is not limited to the above-described embodiments, and the type of the light-emitting device can be appropriately selected according to the state of use when a wide illuminating surface area is required or when spot-like bright illuminated portion is necessary. Further, the shape and material of each component can be also changed appropriately.

[Another Embodiment Relating to LED Arrangement]

Figure 6:
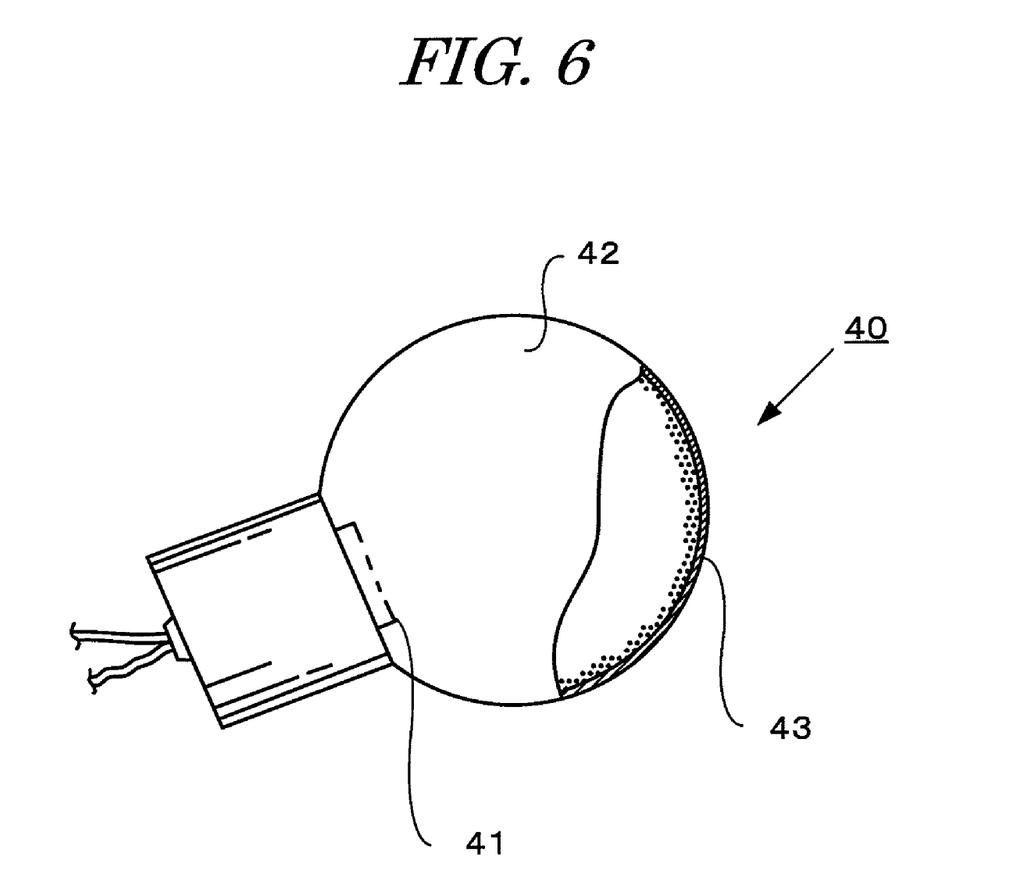
FIG. 6 is a side view of the main portion of another embodiment according to the present invention.

For example, the optimum number of installed LED, which are light sources, can be freely selected based on the required brightness or heat generation conditions including the arrangement of a heat sink. The installation locations also can be freely selected. More specifically, an application to an elongated light-emitting device 40 using a LED 41 as shown in FIG. 6 is also included in the scope of the present invention. In the present embodiment, an elongated transparent body 42 composed of a cylindrical member is provided, and the LED 41 is disposed inside thereof. Further, a light-scattering layer 43 is formed by coating on the circumferential surface on the side of the transparent body 42 that is opposite the LED 41, that is, on the illuminating side (right side in FIG. 6) where the light from the LED 41 is illuminated.

With such embodiment, similarly to the above-described embodiments, sufficient quantity of light can be ensured, while scattering the light from the LED 41 in an optimum mode with the light-scattering layer 43 formed on the transparent body 42. Therefore, uniform and bright light emission can be performed and also a contribution is made to cost reduction. Another advantage of the present embodiment is that the light cover that holds the transparent body 42 is unnecessary and, therefore, the configuration is further simplified.

[Another Embodiment Relating to Binder Layer of Light-Scattering Layer . . . Mixture of Nitrocellulose and Alkyd Resin is Used]

The composition of the light-scattering layer also can be appropriately changed. More specifically, a composition composed of 50 parts by weight of a mixture of nitrocellulose and alkyd resin and having 46 parts by weight of an organic solvent and 4 parts by weight of a filler added thereto may be coated by a spraying method instead of the acrylic resin as a binder.

In this case, a silica powder composed of substantially spherical fine particles with a mean particle size of 5 μm is used as the filler, and the coating thickness of the light-scattering layer is 10 μm in a dry state. A mixture of an alcohol, a ketone, an ester, and a toluene is used as the organic solvent. With the light-emitting device in which the light-scattering layer is formed in the above-described manner and a transparent body is coated thereupon, uniform and even light-illuminating is obtained over the entire illuminating surface of the transparent body. Nitrocellulose used in the binder layer has excellent optical characteristics, that is, excels in transparency and filler dispersion characteristic. As a result, the light-scattering layer demonstrates a light scattering characteristic of higher quality and is very effective as a base material for a binder layer.

[Another Embodiment Relating to Binder Layer of Light-Scattering Layer . . . Polyisocyanate Compound Mixture]

The composition of the light-scattering layer 31 in the first embodiment also includes the below-described embodiments. Namely, it is possible to use a polyurethane resin or a polyester resin instead of the acrylic resin, without using an organic solvent.

A polyurethane resin makes it possible to obtain a desired hardness by combining a polyisocyanate compound and a polyol compound and is, therefore, advantageous for increasing hardness. More specifically, a polyisocyanate compound may be mixed immediately prior to coating in an amount equivalent to 15% with a polyurethane resin to obtain a mixture for coating. A light-scattering layer that is cured by holding for 10 h in a furnace at 50° C. after sufficient drying can thus be formed.

The light-scattering layer formed in the above-described manner has a hardness substantially increased by comparison with that of the light-scattering layer 31 obtained in the first embodiment and the resistance to damage can be accordingly improved. More specifically, the results obtained in measuring a hardness by a pencil hardness test demonstrate that the hardness of the light-scattering layer 31 of the first embodiment is F, whereas the hardness of the light-scattering layer using the polyisocyanate compound increases to 3H.

In the light-scattering layer with increased hardness, Young's modulus can be increased and curing can increase the glass transition temperature. The resultant merit is that weather resistance (resistance to moisture and resistance to thermal) is improved. This is since the curing reaction provides the light-scattering layer with a three-dimensional structure and increased chemical resistance thereof. As a result, there is no risk of the light-scattering layer being permeated by scattered organic solvents, and durability is improved.

[Another Embodiment Relating to Binder Layer of Light-Scattering Layer . . . Organic Solvent is Not Used]

When a polyester resin is used in the composition of the light-scattering layer 31 in the first embodiment, for example, it is possible to use a polyester polyol, mix a polyisocyanate compound in an amount equivalent to 10% therewith immediately prior to coating, and use the mixture for coating.

Likewise, it is possible to use a vinyl chloride-vinyl acetate-vinyl alcohol copolymer, mix a polyisocyanate compound in an amount equivalent to 8% therewith immediately prior to coating, cure, and coat the mixture. Alternatively, a solvent-free coating material containing an epoxy-modified polyol, which is an epoxy resin, and a polyisocyanate curing agent as the main components, or a silicon-fluorine copolymer, which is a silicone resin, can be used as the composition for the light-scattering layer 31 in the case no organic solvent is used, and the same action and effect can be obtained by using these compositions for coating. The light-scattering layer 31 of such a composition is formed by coating the composition, sufficiently drying, allowing to stay for 10 hours in a furnace at 50° C., and curing the coating. Finely powdered silica is used as the filler.

The light-scattering layer produced in the above-described manner has high durability, and light-illuminating uniform in the longitudinal direction and having no intensity unevenness is obtained in the elongated transparent body coated with the light-scattering layer. Further, uniform light-illuminating having no intensity unevenness is also realized in a ring-shaped transparent body coated with such light-scattering layer. In particular, a light-scattering layer with excellent water repelling ability can be obtained by using a silicon-fluorine copolymer.

[Another Embodiment Relating to Filler of Light-Scattering Layer . . . Fine Powder of Cross-Linked Polystyrene]

The material of the filler in the light-scattering layer can be changed appropriately. Namely, any of the following ten kinds of fine powders may be employed instead of silica as a filler in the composition of the light-scattering layer 31 of the first embodiment.

Namely, the coating composition can be produced for coating by using any of the following fillers: glass (mean particle size 5 to 6 μm), alumina (mean particle size 5 μm), titanium oxide (4 parts by weight, mean particle size 0.26 μm), polypropylene (mean particle size 5 μm), polyethylene (mean particle size 5 μm), cross-linked poly(butyl methacrylate) (mean particle size 5 μm), poly(butyl methacrylate) (mean particle size 5 μm), cross-linked polystyrene (mean particle size 6 μm), polyurethane (mean particle size 7 μm), and acryl-silicon copolymer (mean particle size 5 to 6 μm). By forming a light-scattering layer on a transparent body by using such materials as a filler, it is possible to ensure uniform LED light illumination without intensity unevenness from the transparent body, regardless of the shape thereof.

[Another Embodiment Relating to the Transparent Body]

The transparent body is not necessarily limited to a substantially round cross section and can be of a variety of other shapes, provided that the object of guiding the light from LEDs in a specific direction is attained. Thus various shapes can be assumed. For example, the transparent body can have a semicircular cross section or the side surface thereof can be scraped off to obtain any shape, and the shape matching the object of use can be produced. In this case, the object of the present invention is attained, provided that a light-scattering layer is formed with the object of scattering light of LED serving as light sources and uniform light-illuminating can be taken out.

The external appearance of the transparent body is not limited to a linear shape such as that of the first embodiment or a ring shape such as in the second embodiment. For example, the transparent body may have a freely bent shape as that of the conventional neon tube and is not restricted by a specific shape. Further, the material of the transparent body can be also changed appropriately and any light-transmitting substance may be used. Therefore, with consideration for cost and processability, for example, a polycarbonate resin, a polyester resin, a silicone resin, glass, silica, or alumina can be advantageously used instead of the acrylic resin employed in the above-described embodiments.

What is claimed is:

1. A light-emitting device that has a LED as a light source, comprising:
    a transparent body that is disposed in the vicinity of the LED or so as to incorporate the LED inside thereof; and
    a light-scattering layer that scatters light of the LED, which is formed by coating, within the surface of the transparent body, on a light-illuminating surface that illuminates the light from the LED to the outside, wherein the light-scattering layer has a thickness of 5 μm to 20 μm.

2. The light-emitting device according to claim 1, wherein the transparent body is composed of an acrylic resin, a polycarbonate resin, a polyester resin, a silicone resin, a polypropylene resin, glass, silica or alumina.

3. The light-emitting device according to claim 1, wherein the transparent body has an elongated cylindrical shape or ring shape.

4. The light-emitting device according to claim 1, wherein a light cover is provided that has a reference direction and a cross-sectional direction perpendicular thereto and is provided with an opening that is open along the reference direction so that the shape in the cross-sectional direction is a substantially U-shape; and
    the transparent body has a reference direction and a cross-sectional direction respectively corresponding to the reference direction and cross-sectional direction of the light cover, the light-scattering layer of the transparent body is formed along the reference direction, and the light-scattering layer is attached to the inner side of the light cover so as to be exposed in the opening of the light cover.

5. A light-emitting device that has a LED as a light source comprising:
    a transparent body that is disposed in the vicinity of the LED or so as to incorporate the LED inside thereof; and
    a light-scattering layer that scatters light of the LED, which is formed by coating, within the surface of the transparent body, on a light-illuminating surface that illuminates the light from the LED to the outside,
    wherein the light-scattering layer is configured by:
    a binder layer comprising an acrylic resin, a mixture of nitrocellulose and an alkyd resin, a polycarbonate, a polyurethane resin, a polyester resin, an epoxy resin, a silicone resin or a vinyl chloride resin; and
    a filler in a form of fine powder composed of an inorganic material containing at least one from silica, glass, alumina, and titanium oxide, or an organic material containing at least one from polypropylene, polyethylene, polymethyl methacrylate, polybutyl methacrylate, polystyrene, polyurethane, and a silicone resin, the filler being filled into the binder layer so as to be uniformly dispersed therein.

6. The light-emitting device according to claim 5, wherein the light-scattering layer contains 2.5 parts by weight to 4 parts by weight of the filler.

7. The light-emitting device according to claim 5, wherein the light-scattering layer has a thickness of 5 μm to 20 μm.

8. The light-emitting device according to claim 5, wherein the transparent body is composed of an acrylic resin, a polycarbonate resin, a polyester resin, a silicone resin, a polypropylene resin, glass, silica or alumina.

9. The light-emitting device according to claim 5, wherein the transparent body has an elongated cylindrical shape or ring shape.

10. The light-emitting device according to claim 5, wherein a light cover is provided that has a reference direction and a cross-sectional direction perpendicular thereto and is provided with an opening that is open along the reference direction so that the shape in the cross-sectional direction is a substantially U-shape; and
    the transparent body has a reference direction and a cross-sectional direction respectively corresponding to the reference direction and cross-sectional direction of the light cover, the light-scattering layer of the transparent body is formed along the reference direction, and the light-scattering layer is attached to the inner side of the light cover so as to be exposed in the opening of the light cover.

* * * * *